(12) United States Patent
Nguyen et al.

(10) Patent No.: US 10,969,526 B2
(45) Date of Patent: Apr. 6, 2021

(54) COATINGS FOR TRANSPARENT SUBSTRATES IN ELECTRONIC DEVICES

(71) Applicant: Apple Inc., Cupertino, CA (US)

(72) Inventors: Que Anh S. Nguyen, San Jose, CA (US); Christopher D. Prest, San Francisco, CA (US); Jody R. Akana, San Francisco, CA (US); Marta M. Giachino, Palo Alto, CA (US); Matthew S. Rogers, San Jose, CA (US); Ove Lyngnes, Carmel Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/900,575

(22) Filed: Feb. 20, 2018

(65) Prior Publication Data

US 2019/0079230 A1   Mar. 14, 2019

Related U.S. Application Data

(60) Provisional application No. 62/556,243, filed on Sep. 8, 2017.

(51) Int. Cl.
 *G02B 5/28* (2006.01)
 *C03C 17/42* (2006.01)
 (Continued)

(52) U.S. Cl.
 CPC .............. *G02B 5/285* (2013.01); *C03C 17/42* (2013.01); *G02B 1/10* (2013.01); *G02B 1/11* (2013.01);
 (Continued)

(58) Field of Classification Search
 CPC .......... G02B 5/285; G02B 1/10; G02B 5/208; G02B 5/26; G02B 5/286; G02B 1/11;
 (Continued)

(56) References Cited

U.S. PATENT DOCUMENTS 4,793,669 A * 12/1988 Perilloux ............... G02B 5/282
 359/355
6,928,095 B2 * 8/2005 Kahen ..................... H01S 5/041
 372/45.01
(Continued)

FOREIGN PATENT DOCUMENTS

CN   100423390 C   10/2008
CN   103955099 A   7/2014
(Continued)

*Primary Examiner* — Stephone B Allen
*Assistant Examiner* — Rahman Abdur
(74) *Attorney, Agent, or Firm* — Treyz Law Group, P.C.; G. Victor Treyz; David K. Cole

(57) ABSTRACT

An electronic device may have a housing surrounding an interior in which electrical components are mounted. A display may be mounted to housing structures in the device. The housing may have a rear wall. The display cover layer and rear wall of the housing may be formed from transparent glass layers. Coatings may be formed on inwardly facing surfaces of the transparent glass layers. A coating on a transparent glass layer may be formed from a thin-film interference filter having a stack of dielectric layers. The coating may include an ink layer on the thin-film interference filter.

19 Claims, 7 Drawing Sheets

(51) Int. Cl.
  *G02B 1/11* (2015.01)
  *G02B 1/10* (2015.01)
(52) U.S. Cl.
  CPC .... *C03C 2217/734* (2013.01); *C03C 2218/36* (2013.01)
(58) Field of Classification Search
  CPC ....... G02B 1/14; C03C 17/42; C03C 2218/36; C03C 2217/734; G09F 9/30
  USPC .......................................................... 359/580
  See application file for complete search history.

(56) References Cited

U.S. PATENT DOCUMENTS

| | | | |
|---|---|---|---|
| 8,008,613 B2 * | 8/2011 | Tam | G01J 1/1626 250/214 AL |
| 8,547,504 B2 * | 10/2013 | Guo | G02B 5/008 349/96 |
| 8,663,806 B2 | 3/2014 | Weber et al. | |
| 9,158,048 B2 * | 10/2015 | Kang | C07C 251/30 |
| 9,810,824 B2 * | 11/2017 | Banerjee | G02B 5/286 |
| 2007/0146887 A1 | 6/2007 | Ikeda et al. | |
| 2008/0174872 A1 * | 7/2008 | Morimoto | G02B 1/16 359/585 |
| 2008/0265387 A1 | 10/2008 | D'Urso et al. | |
| 2011/0177300 A1 | 7/2011 | Hankey et al. | |
| 2012/0162095 A1 | 6/2012 | Liang et al. | |
| 2012/0170124 A1 * | 7/2012 | Fuhse | G02B 5/285 359/585 |
| 2012/0170284 A1 * | 7/2012 | Shedletsky | G02F 1/13318 362/355 |
| 2013/0265668 A1 * | 10/2013 | Banerjee | G02B 5/22 359/885 |
| 2014/0090864 A1 | 4/2014 | Paulson | |
| 2014/0118826 A1 * | 5/2014 | Jiao | G02B 5/30 359/491.01 |
| 2014/0233105 A1 | 8/2014 | Schmeder et al. | |
| 2015/0192897 A1 * | 7/2015 | Schilling | B42D 25/355 359/2 |
| 2015/0322270 A1 * | 11/2015 | Amin | C03C 17/3435 428/141 |
| 2015/0323705 A1 | 11/2015 | Hart et al. | |
| 2017/0184762 A1 | 6/2017 | Fujii et al. | |
| 2017/0184764 A1 * | 6/2017 | Matsuyuki | G02B 5/208 |
| 2017/0192133 A1 | 7/2017 | Murakami et al. | |

FOREIGN PATENT DOCUMENTS

| | | |
|---|---|---|
| CN | 106132141 A | 11/2016 |
| JP | 2008-083262 A | 4/2008 |
| JP | 2008-083263 A | 4/2008 |
| JP | 2008-083423 A | 4/2008 |
| JP | 2010-173090 A | 8/2010 |
| JP | 2011-013546 A | 1/2011 |
| JP | 2013519151 A | 5/2013 |
| JP | 2013-152637 A | 8/2013 |
| JP | 2014-056227 A | 3/2014 |
| JP | 2014-079944 A | 5/2014 |
| JP | 2015-512057 A | 4/2015 |
| JP | 2015-230701 A | 12/2015 |
| JP | 2016-153845 A | 8/2016 |
| JP | 3208984 U | 3/2017 |
| JP | 2017515780 A | 6/2017 |
| WO | 2003031362 | 4/2003 |
| WO | 2011/096960 A1 | 8/2011 |
| WO | 2015/175390 A1 | 11/2015 |
| WO | 2016118683 | 7/2016 |

\* cited by examiner

COATINGS FOR TRANSPARENT SUBSTRATES IN ELECTRONIC DEVICES

This application claims the benefit of provisional patent application No. 62/556,243, filed Sep. 8, 2017, which is hereby incorporated by reference herein in its entirety.

FIELD

This relates generally to electronic devices and, more particularly, to coatings for transparent substrates in electronic devices.

BACKGROUND

Electronic devices often contain displays. A display may have an active area with pixels that display images for a user and an inactive area alongside the active area. A layer of glass may serve as a protective display cover layer. The layer of glass may overlap the active area and the inactive area. A layer of glass may also form part of a housing for an electronic device. To hide internal components from view, surfaces in an electronic device such as the inner surface of a layer of glass forming a housing for an electronic device and the inner surface of the protective display cover layer in the inactive area of a display may be covered with a layer of ink.

It may be desirable to improve the outward appearance of the display cover layer in the inactive area or the output appearance of a glass housing layer. This can be challenging, because glass is sensitive to stress. If care is not taken, a coating on a glass layer in an electronic device may make the glass layer susceptible to cracking. It can also be difficult to control the appearance of coating layers, which can make it difficult to manufacture electronic devices of uniform appearance.

SUMMARY

An electronic device may have a housing in which a display is mounted. The housing may be formed from housing structures that surround an interior region in the electronic device. Electrical components may be mounted in the electronic device interior.

The display may be coupled to the housing structures on a front face of the electronic device. The housing structures may include a rear wall on an opposing rear face of the electronic device.

A display cover layer for the display may have a surface that faces the interior of the housing. The rear wall may also have a surface that faces the interior of the housing. Structures in the electronic device such as the display cover layer and rear housing wall may be formed from transparent glass layers. Coatings may be formed on the inwardly facing surfaces of the transparent glass layers.

A coating on a transparent glass layer may be formed from a thin-film interference filter having a stack of dielectric layers. The coating may also include an ink layer on the thin-film interference filter.

DETAILED DESCRIPTION

Electronic devices such as cellular telephones often include glass members such as display cover glass layers and glass housing members. These layers are traditionally coated with materials such as ink. The ink may be opaque to hide internal device components from view, but may not always have a desired appearance. The appearance of glass layers in an electronic device can be altered by depositing inorganic layers such as physical vapor deposition (PVD) inorganic layers onto the glass layers. Challenges arise, however, in ensuring that the deposited layers produce desired optical effects (e.g., desired transmission, opacity, and reflection values at various viewing angles) while minimizing undesired manufacturing variations.

Figure 1:
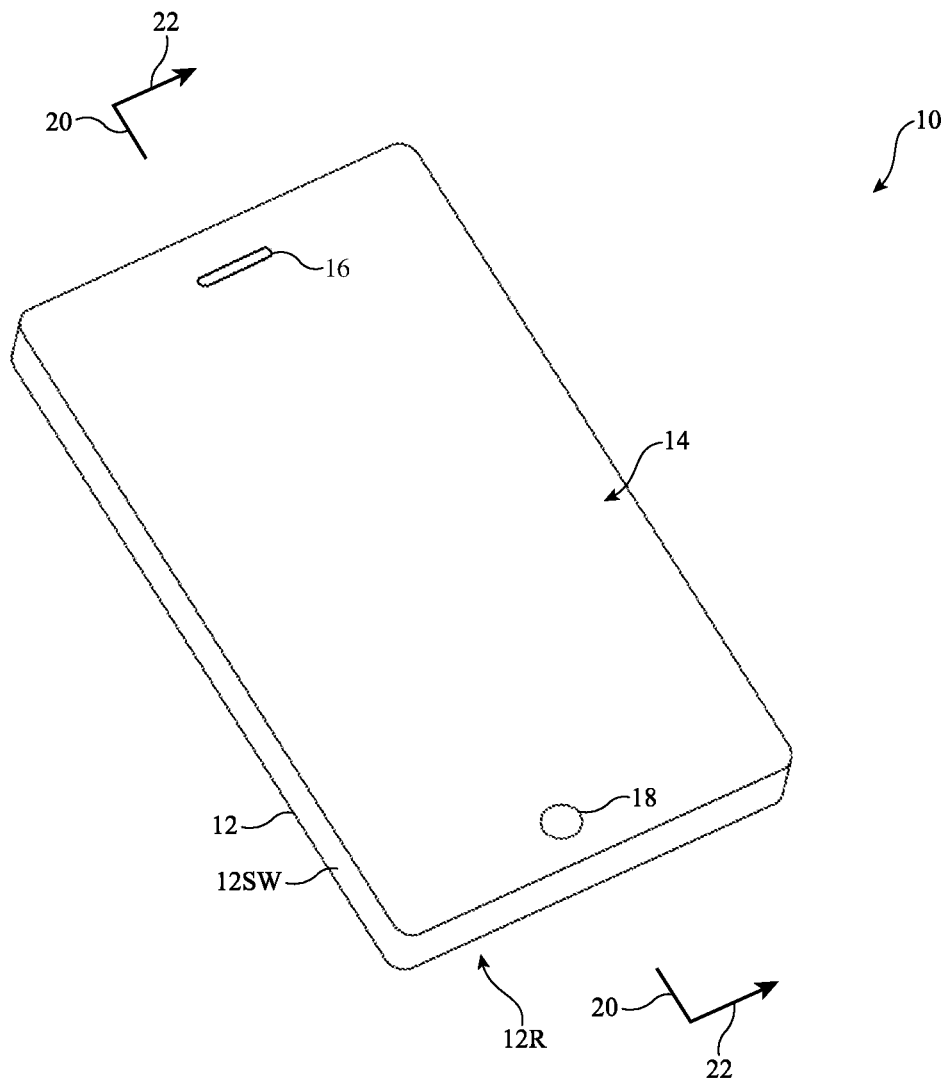
FIG. 1 is a perspective view of an illustrative electronic device in accordance with an embodiment.

To address these challenges, a device such as electronic device 10 of FIG. 1 may have transparent glass layers or other substrates coated with coatings that include thin-film interference filters and ink layers. In these coatings, thin-film interference filter layers may be arranged to produce non-neutral colors or to produce neutral colors. The thin-film interference filter layers may be coated with ink such as neutrally colored ink or ink with a non-neutral color. Optional buffer layer material may be included in the coatings. In some configurations, thin-film interference layers may be supported by a polymer film and attached to a transparent glass layer using a layer of adhesive.

An illustrative electronic device of the type that may have one or more coated structures is shown in FIG. 1. The coated structures in device 10 of FIG. 1 may include transparent structures such as transparent glass structures (e.g., transparent glass substrates or other transparent substrates that form display cover layers, rear housing walls, other housing structures, camera windows, lenses with curved surfaces and/or other curved members, and/or other structures). If desired, other substrates may be coated (e.g., opaque structures, structures formed from materials other than glass, etc.). Illustrative configurations in which transparent glass substrates in device 10 are coated are described herein as an example.

Coated substrates such as transparent glass substrates may be oriented in device 10 so that the coatings face outwardly or inwardly. For example, coatings may be located on the inner (interior) surfaces of the substrates (the sides of the substrates facing inwardly into the interior of device 10) so that these coatings may be viewed through the substrates from outside the device.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, an accessory (e.g., earbuds, a remote control, a wireless trackpad, etc.), or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes display 14. Display 14 has been mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, bezel structures, housing sidewall structures, rear housing walls formed from glass plates or other planar transparent members, metal, plastic, and/or other materials, and/or other housing members). Openings may be formed in housing 12 to form communications ports, holes for buttons, and other structures.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 14 may have a central active area that includes an array of pixels. The array of pixels may be formed from liquid crystal display (LCD) components, an array of electrophoretic pixels, an array of plasma display pixels, an array of organic light-emitting diode pixels or other light-emitting diode pixels, an array of electrowetting pixels, or pixels based on other display technologies. In some configurations, an inactive border area that is free of pixels may run along one or more edges of display 14.

Display 14 may be protected using a display cover layer such as a layer of transparent glass, clear plastic, transparent ceramic, sapphire or other transparent crystalline material, or other transparent layer(s). The display cover layer may have a planar shape, a convex curved profile, a concave curved profile, a shape with planar and curved portions, a layout that includes a planar main area surrounded on one or more edges with a portion that is bent out of the plane of the planar main area, or other suitable shape. If desired, one or more openings may be formed in the display cover layer to accommodate optional components such as button 16, ports such as speaker port 18, and other structures. In some configurations, display 14 may have an outer layer such as a color filter layer or a thin-film transistor layer in a liquid crystal display that is sufficiently thick and strong to serve as a display cover layer. In other configurations, the outermost layer of display 14 may be a separate cover layer that does not have any color filter elements or thin-film transistor circuitry.

Illustrative device 10 of FIG. 1 has a rectangular footprint (outline when viewed from above) with four peripheral edges. Housing 12 may have sidewalls 12SW that run along the four peripheral edges of device 10. Sidewalls SW may be vertical sidewalls, curved sidewalls, integral portions of a rear housing wall that extend fully or partly up the sides of housing 12, and/or other suitable sidewall structures. In some configurations, display 14 has peripheral portions that extend down some or all of the side edges of device 10. Housing 12 may have a rear wall such as rear wall 12R. Rear wall 12R may be formed from integral portions of sidewalls 12SW and/or from separate structures. Rear wall 12R may have a substantially planar surface on a rear face of device 10. Display 14 may include a parallel planar surface on the opposing front face of device 10.

Figure 2:
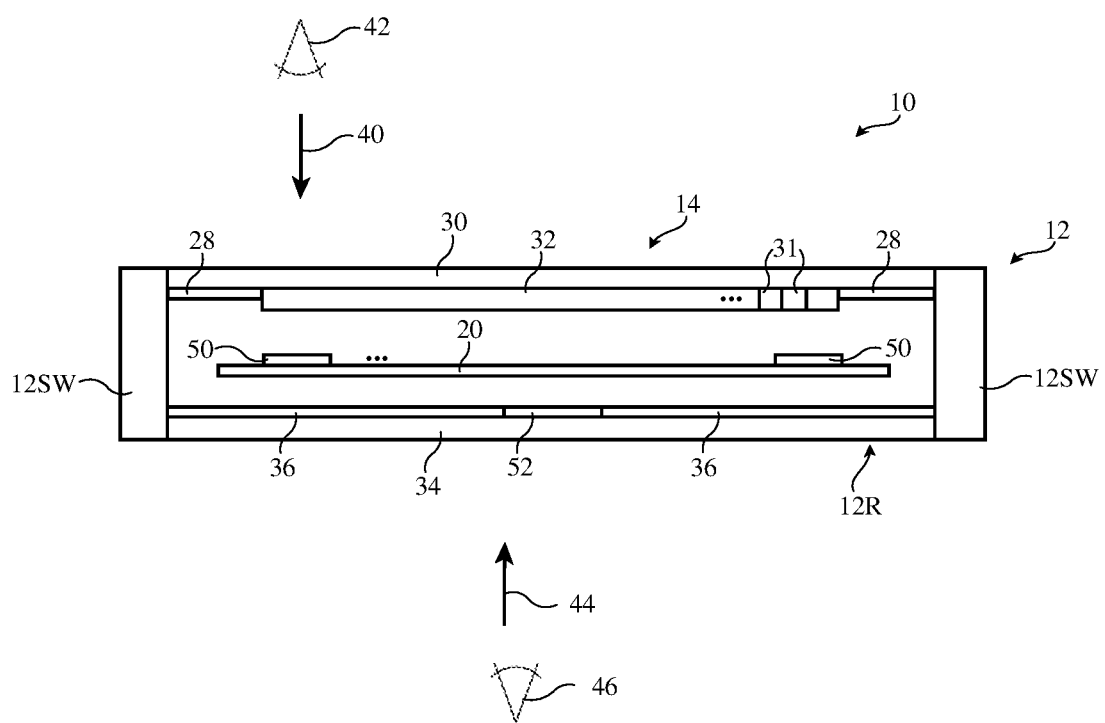
FIG. 2 is a cross-sectional side view of a portion of an illustrative electronic device having transparent substrates with coatings in accordance with an embodiment.

A cross-sectional side view of device 10 taken along line 20 and viewed in direction 22 of FIG. 1 is shown in FIG. 2. As shown in FIG. 2, device 10 may have an interior in which electrical components 50 are housed. Electrical components 50 may include integrated circuits, sensors, and other circuitry. Components 50 may be mounted on one or more printed circuits such as printed circuit 48.

Display 14 of FIG. 2 may have a transparent layer such as display cover layer 30 (i.e., the outermost layer of display 14). Display cover layer 30 may be formed from a transparent material such as glass, plastic, sapphire or other crystalline material, transparent ceramic, etc. In the active area of display 14, display 14 may contain pixel array structures 32 (e.g., an organic light-emitting diode display layer, a liquid crystal display module, etc.) with an array of pixels 31 for displaying images.

Rear housing wall 12R may be formed from a planar member such as a transparent glass substrate (transparent glass member 34). Transparent glass substrates such as display cover layer 30 and/or member 34 may be provided with coatings. In the example of FIG. 2, the underside of display cover layer 30 in the inactive area of display 14 has been coated with coating 28. The inner surface of member 34 (e.g., a glass plate) has been provided with coating layer 36 and coating 52. Coating 52 may be formed from the same coating materials as coating layer 36 and/or may be formed differently so that coating 52 has a different visual appearance than coating 36. Coating 52 may, as an example, be patterned to form text, a logo, or other suitable visual element on the rear of housing 12. A user such as viewer 42 who is viewing the front face of device 10 in direction 40 may view coating 28 through display cover layer 30. A user such as viewer 46 who is viewing the rear face of device 10 in direction 44 may view coatings such as coating 36 and coating 52 through member 34. If desired, sidewalls 12SW may be formed from transparent glass structures (e.g., sidewall members or portions of layer 30) and coatings such a coatings 28, 36, and/or 52 may be formed on the inner surfaces of these members (as an example).

Coatings such as coatings 28, 26, and 52 may be formed from dielectric layers, metal layers, and/or other layers of material. These layers may be deposited by spraying, printing (e.g., screen printing, inkjet printing, pad printing, etc.), dripping, painting, chemical vapor deposition (e.g., plasma enhanced chemical vapor deposition,), physical vapor deposition (e.g., evaporation and/or sputtering), atomic layer deposition, electroplating, lamination, and other deposition techniques. Coatings may be patterned using shadow mask deposition, printing patterning techniques, photolithography (lift-off, etching, etc.), laser patterning (e.g., ablation), mechanical patterning (e.g., drilling, grinding, milling, etc.) and/or other patterning techniques.

In some arrangements, multiple thin-film layers for a coating may be formed in a stack. Thin-film stacks such as these may form thin-film interference filters (sometimes referred to as dichroic filters or dichroic layers). The optical properties of each of the layers in a thin-film stack (e.g., the index of refraction of each layer) and the thickness of each layer may be selected to provide the thin-film interference filter with desired characteristics (e.g., a desired light transmission spectrum, a desired light reflection spectrum, a desired light absorption spectrum). These characteristics may provide a coating with a desired appearance when present on the inner surface of a transparent substrate (e.g., a desired color, etc.). A thin-film stack may, as an example, be configured to reflect light of a particular color or to exhibit a color-neutral behavior (e.g., to serve as a neutral-color partially reflective mirror).

Figure 3:
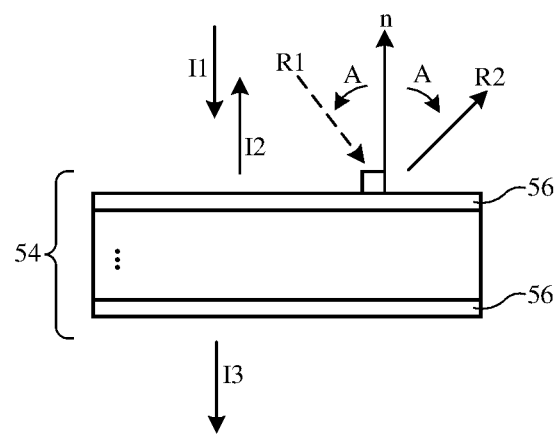
FIG. 3 is a cross-sectional side view of a coating layer formed from a multilayer dielectric stack in accordance with an embodiment.

FIG. 3 is a cross-sectional side view of an illustrative thin-film stack configured to form a thin-film interference filter. The thin-film stack of FIG. 3 has multiple layers 56. Layers 56 may have thicknesses of 0.01-1 micron, at least 0.05 microns, at least 0.1 microns, at least 0.15 microns, less than 1.5 microns, less than 1 micron, etc. Layers 56 may be inorganic dielectric layers (e.g. oxides such as silicon oxide, niobium oxide, titanium oxide, tantalum oxide, zirconium oxide, magnesium oxide, etc., nitrides such as silicon nitride, oxynitrides, and/or other inorganic dielectric materials). Organic dielectric layers (e.g., clear polymer layers) and/or other materials (thin metal films, semiconductor layers, etc.) may also be included in the thin-film stack, if desired.

In the example of FIG. 3, the thin-film stack formed from layers 56 forms thin-film interference filter 54. Filter 54 may be formed form dielectric materials such as inorganic dielectric layers deposited with physical vapor deposition techniques and may therefore sometimes be referred to as a physical vapor deposition layer, physical vapor deposition coating, or physical vapor deposition stack. Other techniques for forming filter 54 may be used, if desired.

Filter 54 may be configured to exhibit high reflectivity (e.g., filter 54 may be configured to form a dielectric mirror that reflects a relatively large amount of light (see, e.g., reflective light I2) relative to incident light I1, may be configured to exhibit low reflectivity (e.g., filter 54 may be configured to form an antireflection coating so that a relatively large amount of light I3 passes through filter 54 relative to incident light I1), may be configured to form a colored (tinted) layer (e.g., by reflecting one or more selected colors of light such as when configuring filter 54 to serve as a bandpass filter, band-stop filter, low pass filter, or high pass filter), and/or may be configured to from a light-blocking layer (e.g., by exhibiting a high opacity). Layers 56 may also be configured to adjust the optical properties (transmission, reflection, absorption) of filter 54 at multiple different values of angle A (e.g., an angle A with respect to surface normal n for filter 54 that is associated with an incident angle of incoming light such as ray R1 and that is also associated with corresponding angle of view for a viewer viewing reflected light such as ray R2).

Figure 4:
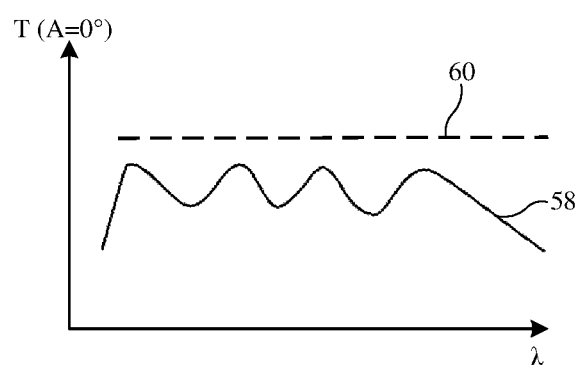
FIG. 4 is a graph of light transmission spectrums for illustrative coating layers in accordance with an embodiment.

FIG. 4 is a graph containing curves 60 and 58 for two respective illustrative light transmission spectrums for filter 54 (e.g., visible light transmission spectrums at an illustrative angle A of 0°). As shown by illustrative curve 58, there may be complex features at multiple different wavelengths (e.g., peaks, valleys, etc.) in the light transmission spectrum for filter 54 (e.g., over visible light wavelengths k). In other configurations (e.g., curve 60), filter 54 is configured to exhibit a neutral color spectrum.

The optical characteristics of filter 54 can be tuned (at one or more values of angle A) by adjusting the attributes of layers 56 (e.g., index of refraction, thickness, etc.). The optical properties of filter 54 may also be adjusted by adjusting the number of layers 56 in filter 54. With one illustrative configuration, the overall thickness of filter 54 is maintained at a relatively low value (e.g., 80-300 nm, less than 3 microns, less than 2 microns, less than 1 micron, at least 0.1 micron) by limiting the thicknesses of each of layers 56 (e.g., to less than 1.5 microns, less than 1 micron, less than 0.5 microns, less than 0.4 microns, etc.) and by limiting the number of layers 56 in filter 54 (e.g., to 2-6, at least 2, at least 3, at least 4, at least 5, fewer than 20, fewer than 14, fewer than 10, fewer than 7, etc.). In general, filter 54 need not be restricted to these configurations and may contain any suitable types of layers 56 and/or may include layers 56 of any suitable thickness, index of refraction, etc.

In some arrangements, it may be desirable for filter 54 to be configured to exhibit a color tint (in reflection and/or transmission). For example, it may be desirable for filter 54 to reflect red light so that filter 54 has a pink color or to reflect light that provides filter 54 with a gold appearance in reflection. In other arrangements, it may be desirable for layer 54 to exhibit a neutral color (e.g., white, gray, black, etc.) and/or a color that is relatively constant in color cast over a wide range of angles A (e.g., a wide range of viewing angles).

The apparent color of filter 54 may be characterized by a color in Lab color space. With one illustrative configuration, filter 54 operates as a partially reflective mirror (e.g., a mirror of 10-20% reflectivity, or a reflectivity of at least 5%, at least 15%, at least 20%, less than 85%, less than 60%, less than 50%, less than 35%, or other suitable value) and exhibits a gray color in reflection (e.g., the reflectivity of filter 54 is neutral in color so that filter 54 forms a color-neutral partially reflective mirror). In this configuration, for example, the color of reflected light may be characterized by Lab color coordinates a and b that are less in magnitude than 5, less in magnitude than 3, or other suitable neutral values (e.g., the value of color coordinate "a" may be about −1 and the value of color coordinate "b" may be about −2). If desired, filter 54 may be configured to exhibit an angularly invariant color. For example, the changes in the magnitudes of color coordinates a and b (e.g., Δa and Δb, respectively) may be maintained at values less than 2, less than 3, less than 4, or other suitable values over a range of viewing angles (reflected light angle A) of 0-60°.

Layers 56 may include inorganic materials such as oxides. For example, layers 56 may include one or more silicon oxide layers and one or more niobium oxide layers. Niobium oxide can be deposited consistently using sputtering and may allow filter 54 to exhibit good color control. Other oxides may be used (e.g., one or more tantalum oxide layers 56 may be interspersed with one or more silicon oxide layers in filter 54, one or more titanium oxide layers 56 may be interspersed with one or more silicon oxide layers, etc.). In some arrangements, higher and lower refractive index materials alternate in the stack of layers forming filter 54. For example, filter 54 may include alternating niobium oxide layers and silicon oxide layers, may include alternating titanium oxide and silicon oxide layers, or may include alternating tantalum oxide layers and silicon oxide layers.

Filter 54 may form part of a coating on a transparent glass substrate in device 10. In this type of configuration, the most inwardly facing layer 56 of filter 54 (e.g., the last layer 56 that is deposited on filter 54 in an illustrative configuration in which filter 54 is formed on a transparent glass substrate) may be formed from a layer of silicon oxide to enhance adhesion with subsequent layers such as a subsequent ink layer. The ink layer may be a polymer containing colorant such as dye and/or pigment. The colorant may have a neutral color such as white, gray, or black, may have a non-neutral color such as red, blue, green, yellow, gold, or may have another suitable color.

Figure 5:
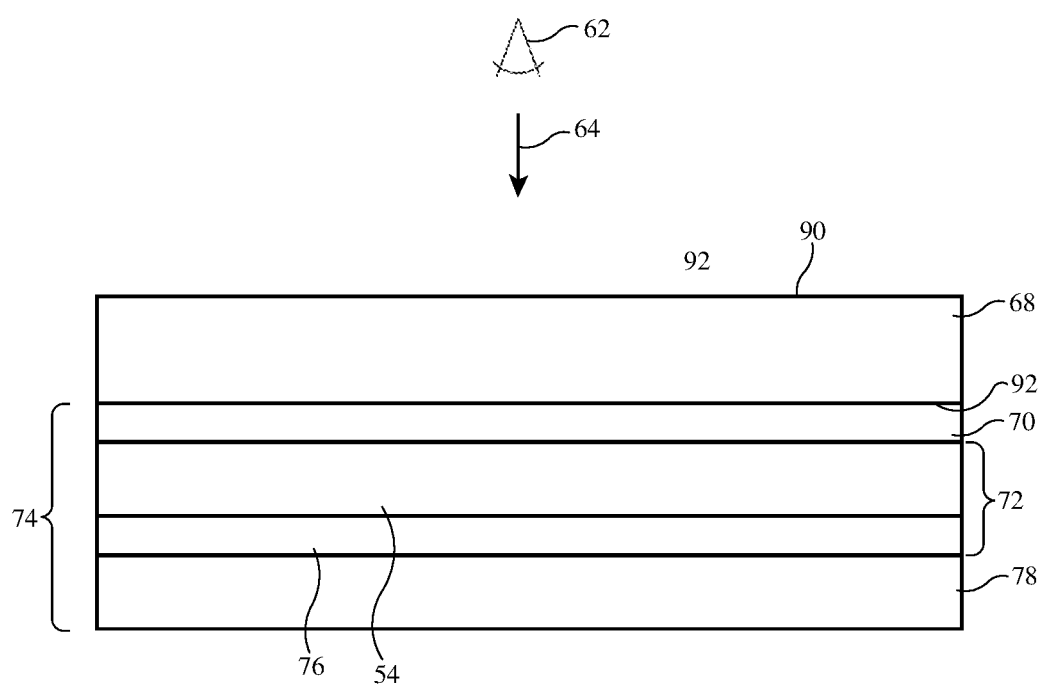
FIG. 5 is a cross-sectional side view of an illustrative transparent substrate having an interior surface coated with an illustrative coating in accordance with an embodiment.

A cross-sectional side view of an illustrative coated substrate for device 10 is shown in FIG. 5. As shown in FIG. 5, substrate 68 (e.g., a transparent glass substrate, etc.) may have an outer surface such as outer surface (exterior surface) 90 that faces a user such as viewer 62 who is viewing substrate 68 in direction 64 and that therefore faces the exterior regions surrounding device 10. Substrate 68 may also have an opposing inner surface 90 (interior surface) that faces the interior of device 10 and housing 12 away from viewer 62. Coating 74 may be formed on inner surface 92 and may face the interior of housing 12 and device 10. Substrate 68 may be, for example, substrate 30 of FIG. 2, substrate 34 of FIG. 2, and/or other substrate in device 10. Coating 74 may be coating 28 of FIG. 2, coating 36 of FIG. 2, coating 52 of FIG. 2, and/or another coating.

In the illustrative configuration of FIG. 5, thin-film interference filter 54 has initially been deposited on a separate substrate (substrate 76). Substrate 76 may be, for example, a sheet of polymer. After forming reflective layer 72 by forming thin-film interference filter 54 on flexible substrate 76, reflective layer 72 may be laminated to inner surface 92 of substrate 68 using a layer of adhesive such as adhesive layer 70 (e.g., a polymer layer). Optional ink layer 78 may be formed on the interior surface of layer 72 (e.g., on the inner surface of substrate 76). If desired substrate 76 may be omitted to help reduce the thickness of layer 74 (e.g., the layers of filter 54 may form layer 72 without using an additional polymer film substrate such as substrate 76). Filter 54 of FIG. 5 may be formed using 2-6 layers 56 or any other suitable number of layers 56. Filter layers in device 10 such as filter 54 may be patterned to form logos, text, icons, and/or other patterns.

Figure 6:
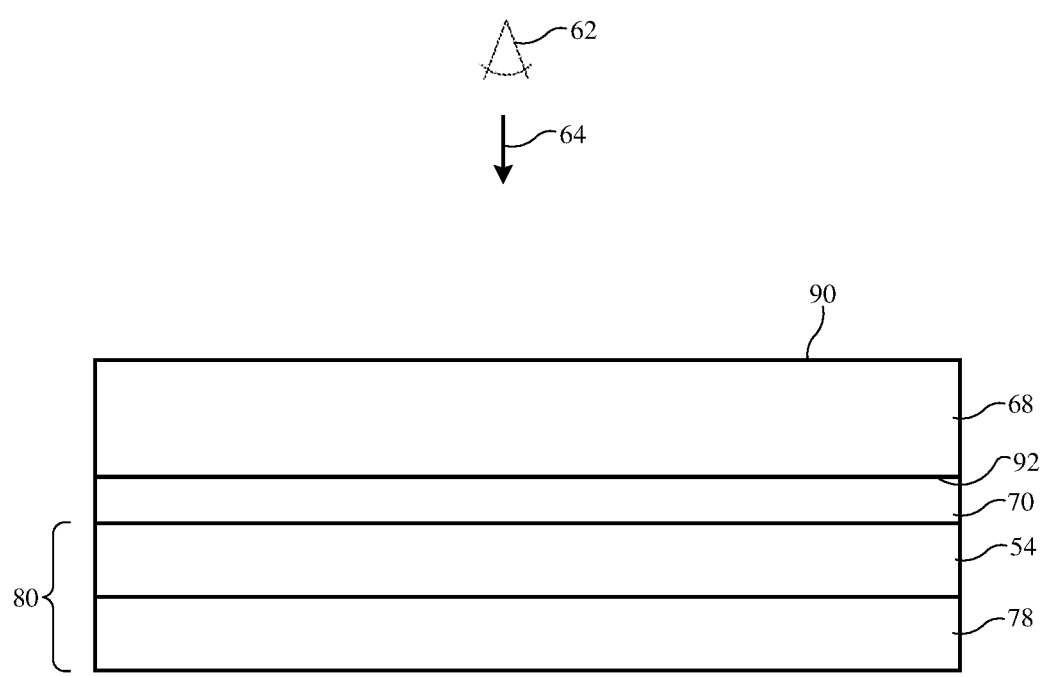
FIG. 6 is a cross-sectional side view of an illustrative transparent substrate having an interior surface coated with another illustrative coating in accordance with an embodiment.

Another illustrative arrangement for providing substrate 68 with a coating on interior surface 92 is shown in FIG. 6. In the example of FIG. 6, coating 80 has been formed on inner surface 92 of substrate 68. Viewer 62 may view coating 80 in direction 64 through the transparent material of substrate 68.

Substrate 68 may be coated with an optional buffer layer such as layer 70. Layer 70 may be a clear polymer and may have a thickness of 50 nm-3 microns, at least 0.1 microns, at least 0.2 microns, at least 0.3 microns, at least 0.5 microns, at least 1 micron, at least 2 microns, 1-3 microns, less than 5 microns, or other suitable thickness. When filter 54 is relatively thick, the presence of optional buffer layer 70 may help reduce stress-induced cracks that might damage substrate 68. If the amount of stress imparted by filter 54 is relatively low, buffer layer 70 may be omitted.

Ink layer 78 may be deposited on the inner surface of filter 54. Filter 54 may include layers 56 such as inorganic dielectric layers of alternating refractive index values. The layer 56 in filter 54 that is immediately adjacent to ink layer 78 may be formed from silicon oxide to promote adhesion (e.g., to ensure that ink layer 78 securely adheres to layer 54). When ink layer 78 is formed from white material or other brightly colored material, ink layer 78 may help reflect light that has been transmitted through substrate 68 outwardly towards viewer 62. When ink layer 78 is black, light transmitted through substrate 68 may be absorbed, so that the color of the light related from filter 54 towards viewer 62 dominates. Gray ink reflects some but not all of the light that has been transmitted through substrate 68. In configurations in which ink 78 has a non-neutral color (e.g., red, green, blue, yellow, gold, etc.), the color of coating 80 will be tinted accordingly. By using a color-neutral and angularly insensitive design for filter 54 (e.g., a gray mirror with a reflectively of 10-30%), filter 54 and therefore coating 80 will be relatively insensitive to performance fluctuations due to manufacturing variations in layers 56. This helps ensure consistency when manufacturing numerous devices 10.

If desired, the overall thickness of layer 80 may be minimized by using a relatively small number of layers 56 in filter 54. This approach may be facilitated by using ink 78 to provide coating 80 with a desired color rather than relying on filter 54 to impart the desired color.

Other configurations may be used for coating 80, if desired. The configuration of coating 80 described in connection with FIG. 6 is merely illustrative. Buffer layer 70 may be included in coating 80 or may be omitted. Filter 54 may form a neutral-color angularly insensitive thin-film interference filter or may have a color and/or exhibit angular changes in color. Filter 54 may be configured to serve as a highly reflective mirror, a partially reflective mirror, an antireflection coating, etc. Layers 56 of filter 54 may be deposited by physical vapor deposition and/or other techniques.

Figure 7:
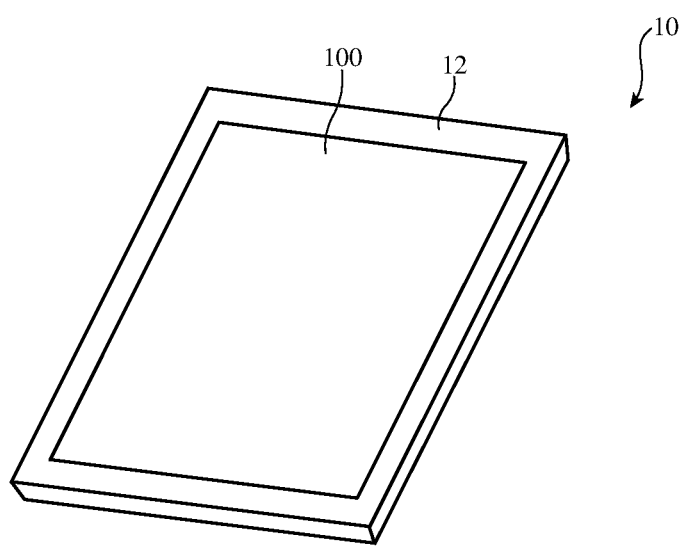
FIG. 7 is a perspective view of an illustrative electronic device having housing walls surrounding a coated transparent glass layer in accordance with an embodiment.
Figure 8:
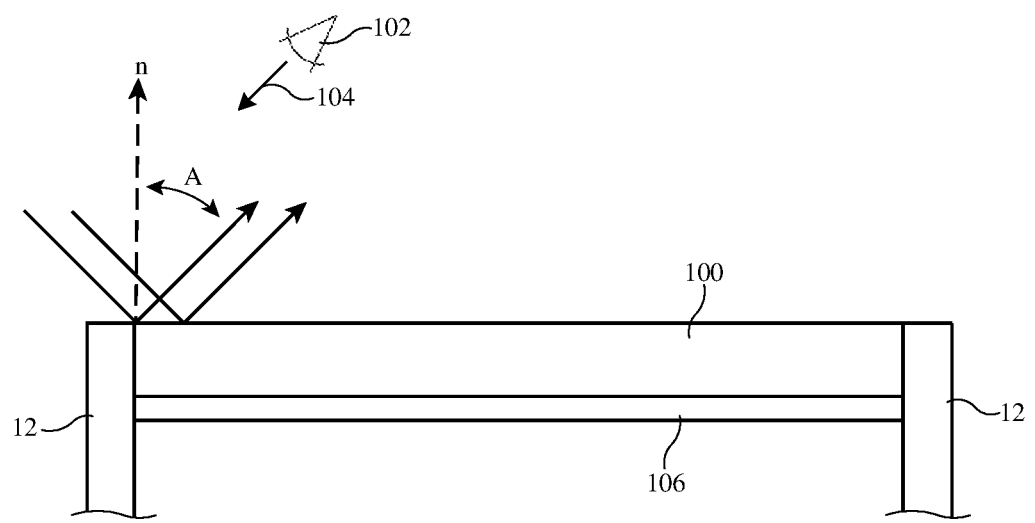
FIG. 8 is a cross-sectional side view of a portion of the electronic device of FIG. 7 in accordance with an embodiment.

The properties of the substrate coatings in device 10 may allow the substrate to be visually matched to nearby structures such as portions of housing 12 at one or more viewing angles. Consider, as an example, the arrangement of device 10 of FIG. 7. As shown in FIG. 7, substrate 100 (e.g., substrate 30, substrate 34, or other suitable substrate in device 10) may be mounted adjacent to a band of housing structures or other exposed portions of housing 12. FIG. 8 is a cross-sectional side view of device 10 of FIG. 7 showing how substrate 100 may have a coating such as coating 106 (e.g., coating 74 of FIG. 5 or coating 80 of FIG. 6).

Coating 106 may include thin-film interference filter 54 and optional ink 78 that are selected to provide substrate 100 with an appearance that matches that of housing 12 and/or that contrasts or otherwise complements that of housing 12. This matching (or contrasting) may occur at one or more viewing angles A. For example, the appearance of housing 12 and coated substrate 100 may match (or contrast in a predetermined fashion) when a viewer such as viewer 102 is viewing substrate 100 at normal incidence and may contrast in a predetermined fashion (or match) when viewer 102 is viewing substrate 100 in direction 104 at an off-axis angle A (e.g., when A is not zero and has another value such as a value of at least 45°).

As an example, housing 12 may have a gold color and coating 106 of substrate 100 may have a configuration that provides substrate 100 with a gold appearance (e.g., at an on-axis viewing angle where A is zero or at an off-axis viewing angle such as when A is at least 45°). In this type of configuration, the appearances of substrate 100 and housing 12 are deliberately blended.

As another example, consider a scenario in which the appearance of coated substrate 100 is configured to be gold at an on-axis viewing angle and in which ink 78 has a contrasting color such as blue. When substrate 100 is viewed at normal incidence (on-axis), a relatively small amount of underlying blue color from ink 78 will be visible so substrate 100 will appear to be gold. When substrate 100 is viewed at an off-axis viewing angle (e.g., at least 45°), however, the blue color of the underlying ink 78 in coating 106 will be visible to the user through coating 106. As a result, the appearance of substrate 100 (e.g., rear housing wall 12R, etc.) will change from gold to blue, depending on the angle at which substrate 100 is viewed.

The foregoing is merely illustrative and various modifications can be made to the described embodiments. The foregoing embodiments may be implemented individually or in any combination.

What is claimed is:

1. An electronic device having an interior and having opposing front and rear faces, comprising:
   housing structures;
   a display coupled to the housing structures;
   a transparent layer that overlaps the display and forms the front face;
   a transparent glass substrate coupled to the housing structures, wherein the transparent glass substrate is a glass housing member on the rear face; and
   a coating across the transparent glass substrate that faces the interior and that is viewable through the transparent glass substrate, wherein the coating comprises a layer of ink and a thin-film interference filter interposed between the layer of ink and the transparent glass substrate, wherein the thin-film interference filter forms a partially reflective mirror, and wherein the partially reflective mirror has a reflectivity that is neutral in color.

2. The electronic device defined in claim 1 wherein the thin-film interference filter is configured to exhibit color coordinate values a and b in Lab color space that are each less than 5 in magnitude.

3. The electronic device defined in claim 2 wherein the ink layer has a non-neutral color.

4. The electronic device defined in claim 1 wherein the thin-film interference filter is configured to exhibit color coordinate value changes $\Delta a$ and $\Delta b$ in Lab color space that are each less than 2 in magnitude over a range of incident light angles relative to the thin-film interference filter of 0° to 60°.

5. The electronic device defined in claim 4 wherein the thin-film interference filter comprises 2-6 inorganic dielectric layers.

6. The electronic device defined in claim 5 wherein the thin-film interference filter includes at least one silicon dioxide layer.

7. The electronic device defined in claim 6 wherein the ink layer adheres to the silicon dioxide layer.

8. The electronic device defined in claim 1 wherein the thin-film interference filter comprises a niobium oxide layer.

9. The electronic device defined in claim 1 wherein the thin-film interference filter comprises a polymer substrate and a stack of multiple dielectric layers of alternating refractive index on the polymer substrate.

10. The electronic device defined in claim 1 wherein the thin-film interference filter comprises a stack of multiple dielectric layers attached to the transparent glass substrate with a layer of adhesive.

11. The electronic device defined in claim 1 further comprising a clear polymer buffer layer between the thin-film interference filter and the transparent glass substrate.

12. An electronic device having an interior and having opposing front and rear faces, comprising:
    housing structures;
    a transparent substrate coupled to the housing structures on the rear face; and
    a coating across the transparent substrate that faces the interior and that is viewable through the transparent substrate, wherein the coating comprises a layer of ink and a stack of multiple inorganic dielectric layers between the layer of ink and the transparent substrate, wherein the stack of multiple inorganic dielectric layers exhibits color coordinate value changes $\Delta a$ and $\Delta b$ in Lab color space over ranges of incident light angles relative to the stack of multiple inorganic dielectric layers, and wherein a maximum color coordinate value change in a and b coordinates in Lab color space across all incident light angles between 0° to 60° is less than 2 in magnitude.

13. The electronic device defined in claim 12 wherein the multiple inorganic dielectric layers include at least one silicon oxide layer and wherein the layer of ink adheres to the silicon oxide layer.

14. The electronic device defined in claim 13 wherein there are fewer than 7 of the inorganic dielectric layers between the layer of ink and the transparent substrate.

15. The electronic device defined in claim 14 wherein the transparent substrate comprises a layer selected from the group consisting of: a display cover glass layer and an electronic device housing wall layer.

16. The electronic device defined in claim 15 wherein the inorganic dielectric layers include at least one niobium oxide layer.

17. Apparatus comprising:
    a glass layer having a surface configured to face an interior of a rear face of an electronic device housing; and
    a coating layer across the glass layer, wherein the coating layer includes a thin-film interference filter formed from a stack of dielectric layers, a layer of adhesive that attaches the stack of dielectric layers to the surface of the glass layer, and an ink layer on the stack of dielectric layers, wherein the stack of dielectric layers exhibits color coordinate value changes $\Delta a$ and $\Delta b$ in Lab color space over ranges of incident light angles relative to the stack of dielectric layers, wherein a maximum color coordinate value change between incident light angles of 0° to 60° is less than 5 in magnitude, and wherein the stack of dielectric layers exhibits a neutral color in reflection for all incident light angles between 0° and 60°.

18. The apparatus defined in claim 17 further comprising a polymer film having first and second opposing surfaces, wherein the stack of dielectric layers is formed on the first surface and wherein the ink layer is formed on the second surface.

19. The apparatus defined in claim 17 wherein the glass layer is selected from the group consisting of: a display cover layer and an electronic device housing wall.

* * * * *